(12) United States Patent
Watanabe et al.

(10) Patent No.: US 12,420,956 B2
(45) Date of Patent: Sep. 23, 2025

(54) ARTIFICIAL SATELLITE AND ARTIFICIAL SATELLITE SYSTEM

(71) Applicant: Hitachi, Ltd., Tokyo (JP)

(72) Inventors: Koichi Watanabe, Tokyo (JP); Tsukasa Funane, Tokyo (JP); Makoto Ito, Tokyo (JP); Yosuke Tanabe, Tokyo (JP); Hisatoshi Kimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/923,918

(22) Filed: Oct. 23, 2024

(65) Prior Publication Data

US 2025/0136299 A1     May 1, 2025

(30) Foreign Application Priority Data

Oct. 26, 2023   (JP) ................. 2023-183769

(51) Int. Cl.
| | |
|---|---|
| *B64G 1/10* | (2006.01) |
| *B64G 1/24* | (2006.01) |
| *B64G 1/42* | (2006.01) |
| *B64G 1/44* | (2006.01) |

(52) U.S. Cl.
CPC ........... *B64G 1/10* (2013.01); *B64G 1/24* (2013.01); *B64G 1/428* (2013.01); *B64G 1/443* (2013.01)

(58) Field of Classification Search
CPC . B64G 1/10; B64G 1/24; B64G 1/428; B64G 1/443; B64G 1/42; B64G 1/44
See application file for complete search history.

(56) References Cited

U.S. PATENT DOCUMENTS

| | | | | |
|---|---|---|---|---|
| 11,142,347 | B1* | 10/2021 | Sedwick | ............... B64G 1/1085 |
| 2018/0257795 | A1* | 9/2018 | Ellinghaus | ............... B64G 1/00 |
| 2019/0023424 | A1* | 1/2019 | Helvajian | ............... B64G 1/645 |

FOREIGN PATENT DOCUMENTS

| | | | | |
|---|---|---|---|---|
| CN | 112977882 | A | * 6/2021 | |
| CN | 114802808 | A | * 7/2022 | ............... B64G 1/10 |
| JP | 3864195 | B2 | 12/2006 | |

(Continued)

OTHER PUBLICATIONS

Extended European Search Report received in corresponding European Application No. 24208299.8 dated Mar. 24, 2025.

*Primary Examiner* — Valentina Xavier
(74) *Attorney, Agent, or Firm* — Mattingly & Malur, PC (57) ABSTRACT

An artificial satellite and artificial satellite system has power transmission and reception efficiency and includes an expandable solar panel that generates power, expandable power transmitting antennas, and expandable beam members to connect the solar panel and the power transmitting antennas to each other. The beam members are expanded from being provided in the artificial satellite, on a plurality of rotational symmetry axes of an imaginary polyhedron formed with substantially a center of the artificial satellite as an origin. The beam members are arranged at substantially equal distances in directions of the rotational symmetry axes. A light receiving surface of the solar panel and installation surfaces of the power transmitting antennas, when expanded, are substantially perpendicular to a solar panel rotational symmetry axis passing through a center of the solar panel, and being arranged on opposite sides of a plane passing through the center of the artificial satellite.

9 Claims, 10 Drawing Sheets

(56) References Cited

FOREIGN PATENT DOCUMENTS

| | | |
|---|---|---|
| JP | 2011-155267 A | 8/2011 |
| JP | 2018-095063 A | 6/2018 |
| JP | 6775230 B2 | 10/2020 |

\* cited by examiner

VIEW AS VIEWED FROM A-DIRECTION

PANEL SYSTEM

FIG. 7

PRESENT INVENTION

FIG. 8

PANEL SYSTEM: TIME 1:38 TO 2:02
AMOUNT OF POWER RECEIVED

FIG. 9

PRESENT INVENTION: TIME 1:38 TO 2:02
AMOUNT OF POWER RECEIVED

FIG. 10

|  | PANEL SYSTEM | PRESENT INVENTION ※ SELECTING AND USING FOUR SURFACES OF POWER TRANSMITTING ANTENNAS |
|---|---|---|
| RATIO OF AMOUNT OF POWER RECEIVED PER DAY | 1.0 | 1.10 ※ AVERAGE PER SURFACE |
| POWER RECEPTION TIME /VISIBLE (PASS) TIME | 32 [%] | 100 [%] |
| POWER RECEPTION TIME RATIO | 1.0 | 3.13 |

FIG. 18

ARTIFICIAL SATELLITE AND ARTIFICIAL SATELLITE SYSTEM

CLAIM OF PRIORITY

The present application claims priority from Japanese Patent Application JP 2023-183769 filed on Oct. 26, 2023, the content of which is hereby incorporated by reference into this application.

BACKGROUND OF THE INVENTION

1. Field of the Invention

The present invention relates to an artificial satellite and an artificial satellite system for forming a space solar power generation and transmission system, and particularly to an artificial satellite and an artificial satellite system having a three-dimensional structure appropriate for light reception/power reception and power transmission.

2. Description of the Related Art

In a space solar power generation and transmission system (Space Solar Power System: SSPS), energy obtained by power generation in a solar battery installed in a geostationary orbit is transmitted to earth by a microwave.

In a present situation, places where structures including artificial satellites are installed in a geostationary orbit are limited, and various countries have been studying the use of an orbit other than the geostationary orbit. An advantage of a low orbit (2000 km or less above the ground), in particular, has been reported in terms of a launching cost. However, in the case of using the low orbit, there is a possibility of a decrease in power reception or power transmission efficiency in a conventional panel system.

In regard to this point, with an objective of providing a lightweight panel structure that can maintain high flatness for each panel, JP-2018-95063-A proposes a "panel structure 1 including a panel array 10 having a plurality of panels 11 in a triangular shape, a frame 20 to which three corner portions of the panel 11 are fixed in a state in which tension is provided to the panel 11 in a direction of increasing mutual intervals among the three corner portions of the panel 11, and a tension adjusting unit 30 that adjusts the tension provided to the panel 11."

SUMMARY OF THE INVENTION

In disposing the space solar power generation and transmission system in space, it is important to retain a solar panel having a large area in a state of being oriented to the sun at all times in order to maintain an overall high power transmission capacity. However, in the case of the low orbit, for example, the system goes around the earth in 1.5 to 2 hours. Thus, a power reception time at a power receiving facility fixed to the ground is a few minutes to approximately 15 minutes.

In regard to this point, with the planar structure described in JP-2018-95063-A, it is difficult to maximize both an amount of power received and an amount of power transmitted because of a positional relation between an artificial satellite as the space solar power generation and transmission system, the sun, and the power receiving facility, and a problem of a decrease in overall efficiency of power reception and power transmission is presented. For example, orienting the artificial satellite toward the sun at all times is difficult, and it is thus difficult to maximize an amount of power generated, at all times.

In light of the abovementioned circumstances, it is an object of the present invention to provide an artificial satellite and an artificial satellite system that can improve the efficiency of power transmission and reception.

From the above, in the present invention, there is provided "an artificial satellite for use in space solar power generation and transmission, the artificial satellite including an expandable solar panel configured to receive solar light and generate power, a plurality of expandable power transmitting antennas configured to transmit power generated by the expandable solar panel to a power receiving facility, and a plurality of expandable beam members configured to connect the expandable solar panel and the plurality of expandable power transmitting antennas to each other, the plurality of expandable beam members being expanded from a state of being provided in the artificial satellite, and on a plurality of rotational symmetry axes of an imaginary polyhedron formed with substantially a center of the artificial satellite as an origin, the plurality of expandable beam members being arranged at substantially equal distances in directions of the rotational symmetry axes, at least one light receiving surface of the expandable solar panel and at least one of installation surfaces of the plurality of expandable power transmitting antennas when expanded from the artificial satellite being substantially perpendicular to a solar panel rotational symmetry axis as a rotational symmetry axis passing through substantially a center of the expandable solar panel, and being arranged on opposite sides of a plane passing through substantially the center of the artificial satellite, and the installation surfaces of the plurality of expandable power transmitting antennas facing in respective different directions when expanded from the artificial satellite."

In addition, in the present invention, there is provided "an artificial satellite system configured by flying the artificial satellite in plural number, the plurality of artificial satellites being configured to transmit power to the same power receiving facility."

According to the present invention, each member adopts a symmetric structure and is easy to expand in space, and the power transmitting antennas are oriented in different directions. It is thus possible to improve the efficiency of power transmission and reception.

DESCRIPTION OF THE PREFERRED EMBODIMENTS

Embodiments of the present invention will hereinafter be described with reference to the drawings.

Incidentally, in a first embodiment, description will be made of the application of a tensegrity structure to space solar power generation and transmission. In a second embodiment, description will be made of achieving an increase in the capacity of space solar power generation by configuring an artificial satellite system by a plurality of artificial satellites. In a third embodiment, description will be made of operation for a plurality of receiving locations on earth or a plurality of receiving locations other than on earth. In a fourth embodiment, description will be made of a thin film having a solar panel and a power transmitting antenna installed on the same surface thereof. In a fifth embodiment, description will be made of having a rectenna as a power converting device.

First Embodiment

Figure 10:
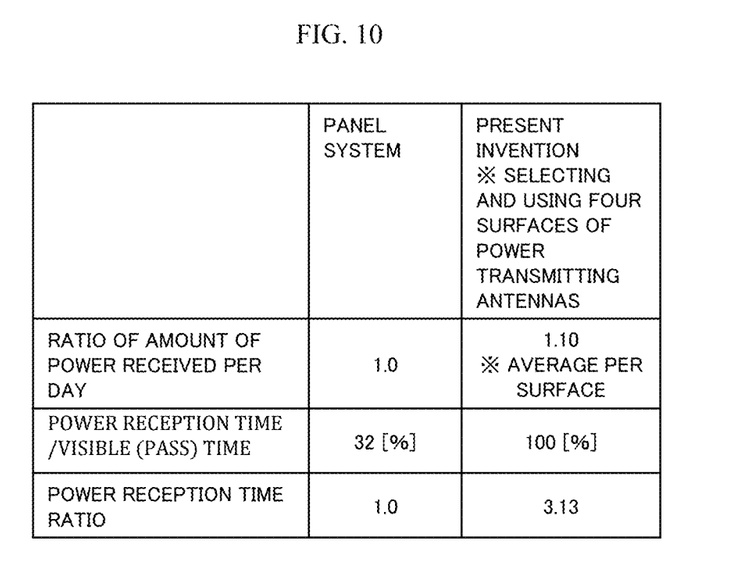
FIG. 10 is a diagram illustrating a result of comparison between the panel system and the present invention.
Figure 11A:
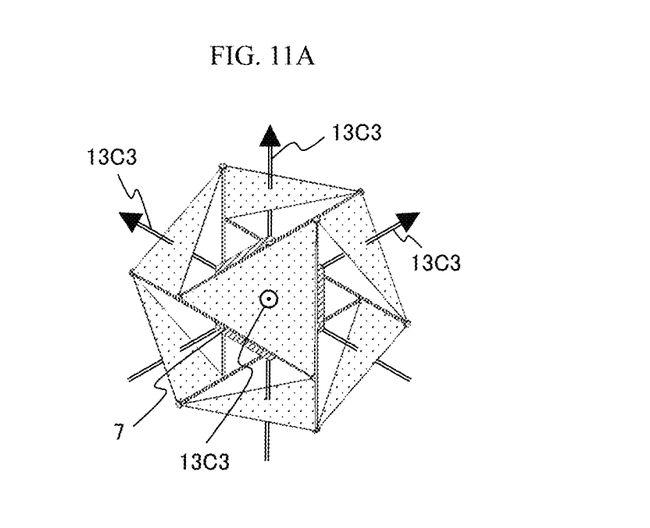
FIG. 11A is a diagram of assistance in explaining C3 rotational axes.
Figure 11B:
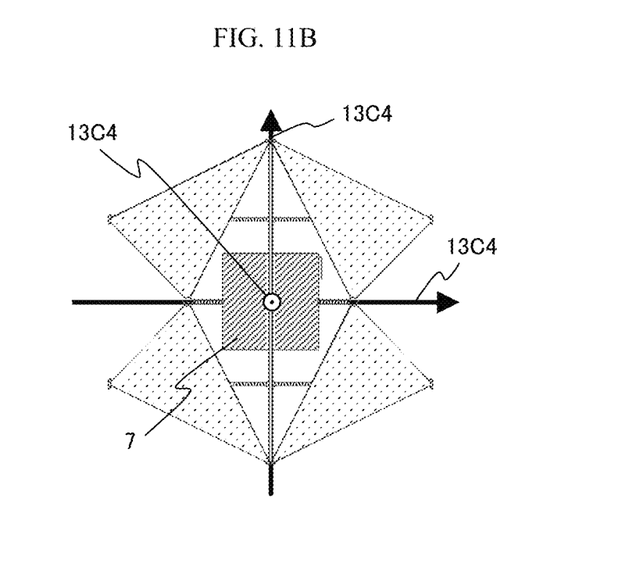
FIG. 11B is a diagram of assistance in explaining C4 rotational axes.
Figure 11C:
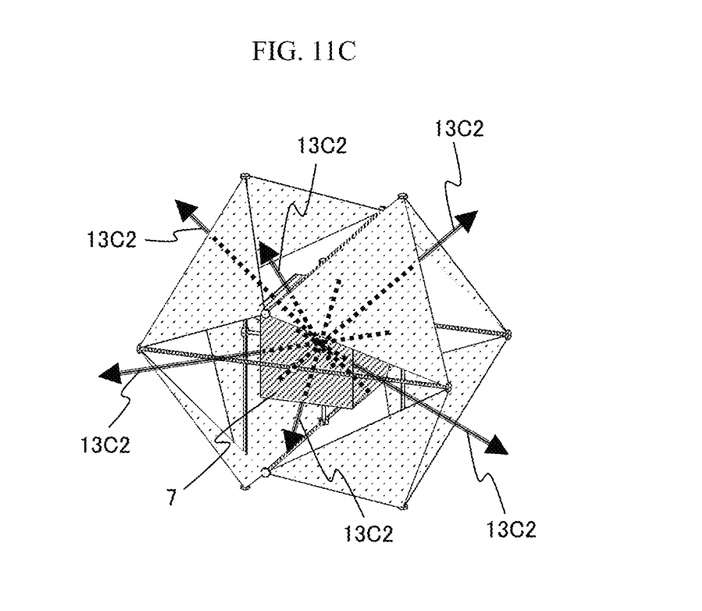
FIG. 11C is a diagram of assistance in explaining C2 rotational axes.

In the first embodiment, the application of a tensegrity structure to space solar power generation and transmission will be described with reference to FIGS. 1 to 11 (FIG. 11A, FIG. 11B, and FIG. 11C).

Figure 1:
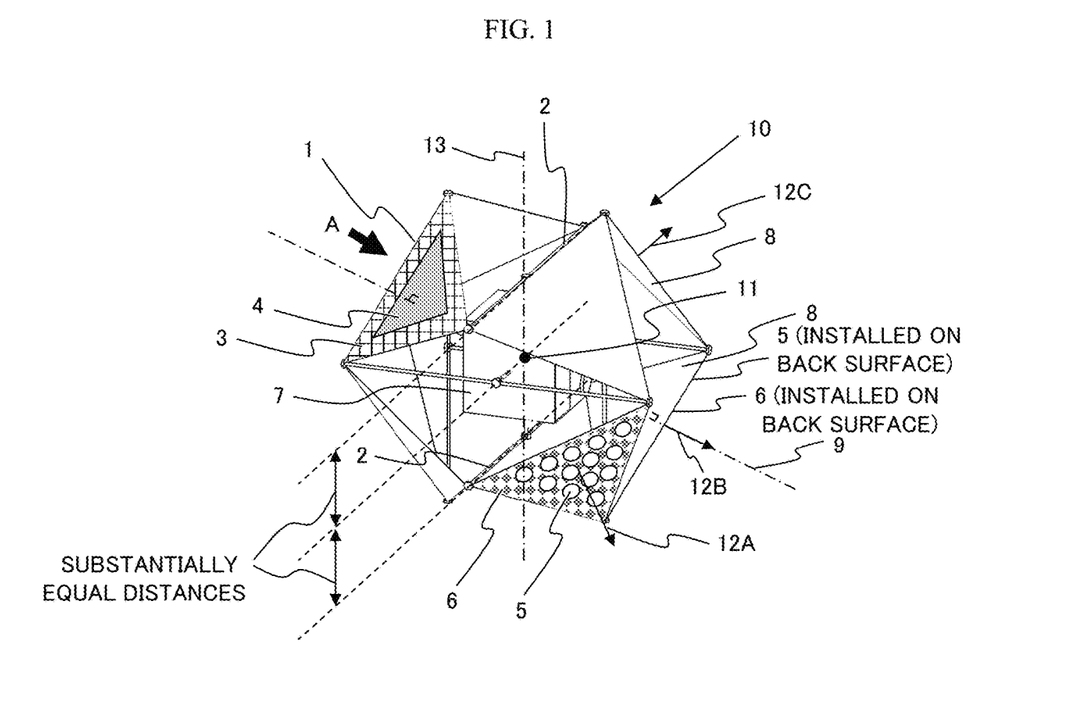
FIG. 1 is a diagram illustrating an example of a basic configuration of an artificial satellite according to a first embodiment of the present invention.

First, FIG. 1 illustrates an example of a basic configuration of an artificial satellite according to the first embodiment of the present invention. An artificial satellite 10 used for space solar power generation and transmission according to the first embodiment of the present invention includes, as main constituent members, a casing 7 that houses a control apparatus and the like, a solar panel 3 that is expanded on the periphery of the casing 7, receives solar light by a light receiving surface 4 thereof, and generates power, a plurality of expandable power transmitting antennas 5 that transmit the power generated by the expandable solar panel 3 to a power receiving facility on earth or the like, a plurality of expandable beam members 2 that connect the expandable solar panel 3 and the plurality of expandable power transmitting antennas 5 to each other, tension members 1 that connect end points of the beam members 2 to each other, and thin films 8 installed in regions enclosed by the tension members 1.

Among these, the plurality of expandable beam members 2 are expanded from a state of being provided in the casing 7 of the artificial satellite 10, and on a plurality of rotational symmetry axes 13 of an imaginary polyhedron formed with substantially a center 11 of the artificial satellite 10 as an origin, the plurality of expandable beam members 2 are arranged at substantially equal distances in directions of the rotational symmetry axes 13.

The light receiving surface 4 of the expandable solar panel 3 and installation surfaces 6 of the plurality of expandable power transmitting antennas 5 when expanded from a state of being housed in the casing 7 are substantially perpendicular to a solar panel rotational symmetry axis 9 as a rotational symmetry axis 13 passing through substantially the center of the expandable solar panel 3, and are arranged on opposite sides of a plane passing through substantially the center 11.

The installation surfaces 6 of the plurality of expandable power transmitting antennas 5 face in respective different directions (directions 12A, 12B, and 12C of the installation surfaces of the power transmitting antennas 5) when expanded from the artificial satellite 10. It suffices for the power transmitting antennas 5 to be a patch antenna array, for example.

Figure 2:
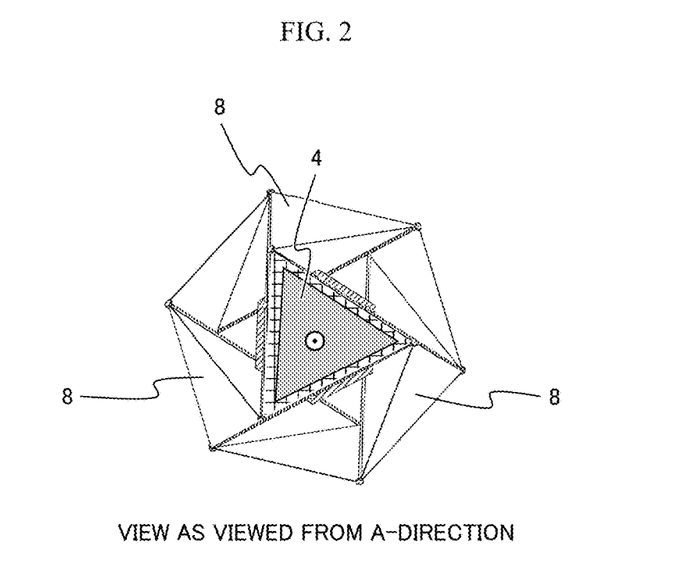
FIG. 2 is a diagram of the artificial satellite 10 of FIG. 1 as viewed from an A-direction.

FIG. 2 illustrates a diagram of the artificial satellite 10 of FIG. 1 as viewed from an A-direction. The thin film 8 is installed in a region enclosed by three tension members 1 that connect vertexes of three beam members 2 to each other.

Figure 3:
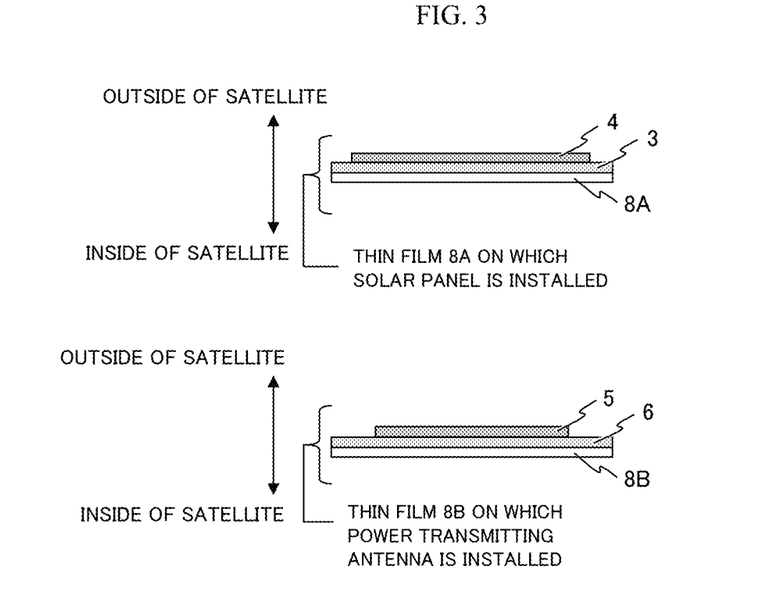
FIG. 3 is a diagram illustrating an example of sectional structures of a thin film 8A on which a solar panel 3 is installed and a thin film 8B on which a power transmitting antenna 5 is installed.

FIG. 3 is a diagram illustrating an example of a sectional structure of a thin film 8A on which the solar panel 3 is installed or a thin film 8B on which the power transmitting antenna 5 is installed. In the case of the thin film 8A on which the solar panel 3 is installed as illustrated in an upper part of FIG. 3, the thin film 8A is so installed as to form a lining in an inward direction of the artificial satellite (on the casing 7 side), and the solar panel 3 and the solar panel light receiving surface 4 are installed on the outside of the satellite. The power transmitting antenna installation surface 6 and the power transmitting antenna 5 are installed on the thin film 8B for installing the power transmitting antenna 5 as illustrated in a lower part of FIG. 3.

As the example of the artificial satellite illustrated in FIGS. 1 to 3, there has been illustrated an example in which the solar panel 3 is disposed on one surface and the power transmitting antennas 5 are arranged on four surfaces. However, there may be adopted a configuration in which solar panels 3 are disposed on four surfaces and power transmitting antennas 5 are disposed on four surfaces. When solar panels 3 are expanded in a range of a half number or more or a hemisphere or more, an effect is expected in that power generation for a long period of time is possible even in a low orbit. In addition, when power transmitting antennas 5 are expanded in a range of a half number or more and a hemisphere or more, an effect is expected in that power transmission in a wide range for a long period of time is possible even in a low orbit.

In implementing the configuration of FIG. 1, a tensegrity structure, for example, is preferably used as a structure for stably maintaining the positional relation between the tension members 1 and the beam members 2. The tensegrity structure is a word coined by combining Tension and Integrity with each other. The tensegrity structure is formed by self-balancing between the tension of tension members (or string members or cables) and the compressive force of compression members (or rod members). The tensegrity structure is known as a structure that is light in weight and stable in shape. In the present embodiment, there has mainly been described a configuration in which eight surfaces of an icosahedron including 12 vertexes are used as a thin film. However, the present embodiment can be carried out also in cases of other polyhedrons.

Figure 4:
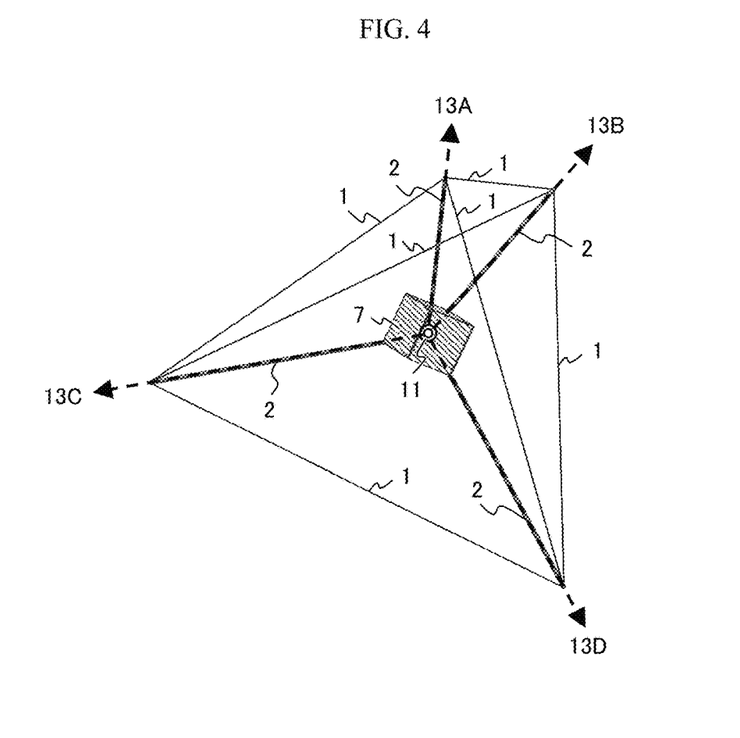
FIG. 4 is a diagram illustrating an example in which the artificial satellite 10 is a tetrahedron.
Figure 5:
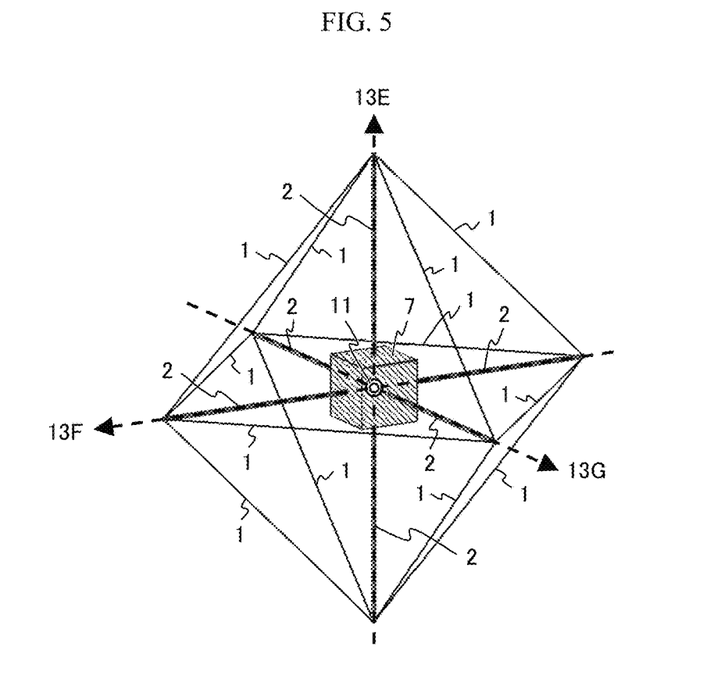
FIG. 5 is a diagram illustrating an example in which the artificial satellite 10 is an octahedron.

FIG. 4 is a diagram illustrating an example in which the artificial satellite 10 is a tetrahedron. FIG. 5 illustrates an example in which the artificial satellite 10 is an octahedron. In each of the configurations, four or eight triangular thin films 8 enclosed by only tension members 1 can be arranged, and these surfaces can be used as thin films 8A on which a solar panel 3 is installed or as thin films 8B on which a power transmitting antenna 5 is installed.

Next, description will be made of a simulation with regard to being able to achieve an improvement in efficiency of power transmission and reception by the artificial satellite 10 having the configuration described with reference to FIGS. 1 to 5 and a result of the simulation.

Figure 6:
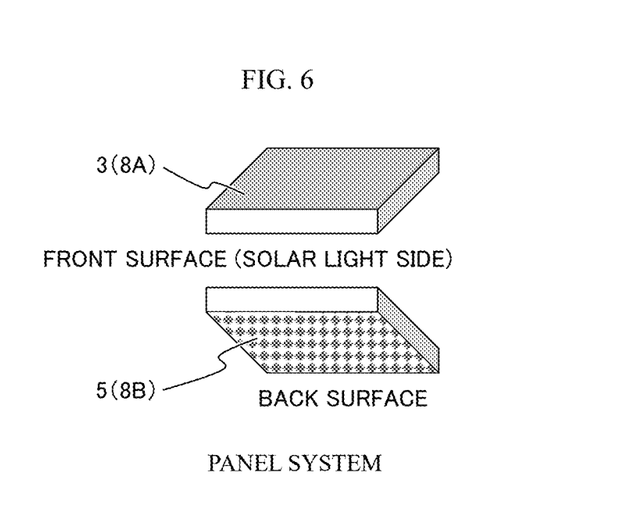
FIG. 6 is a diagram illustrating a configuration at a time of a simulation of a panel system.
Figure 7:
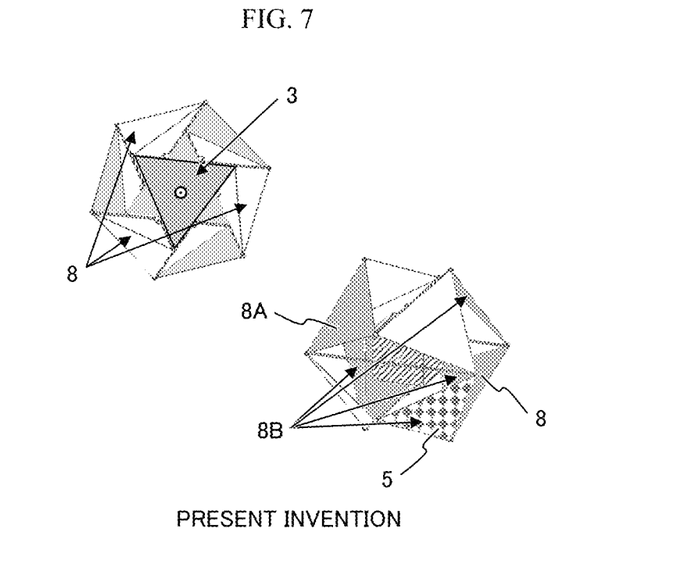
FIG. 7 is a diagram illustrating a configuration at a time of a simulation of the present invention.

FIG. 6 illustrates a configuration diagram at a time of a simulation of the panel system. In FIG. 6, the solar panel 3 is installed on a sun side, and the power transmitting antenna 5 is installed on a back surface. FIG. 7 illustrates a configuration diagram at a time of a simulation of the present invention. The thin films 8B on which four power transmitting antennas 5 are installed are arranged in directions different from that of the thin film 8A on which the solar panel 3 is installed. In FIG. 7, the power transmitting antenna 5 on the front surface of one of the thin films 8B on which the power transmitting antennas 5 are installed is visible, and three thin films 8B on the undersides are visible.

In the simulations, total amounts of power received in the present invention and the panel system in a space solar power generation system (SSPS) were compared with each other. As an orbit, a low orbit (meteorological satellite National Oceanic and Atmospheric Administration (NOAA)) was selected. In addition, an access time of the NOAA-1 was assumed as an access time (time of power transmission and reception in a pass time [visible time from a ground station]). As for a solar panel area, one surface of the same size was set under two kinds of conditions. As for satellite attitude control, control was performed such that the solar panel light receiving surface was oriented to the sun. In the panel system, the transmitting antenna was set to be a one-surface array antenna (1 m$^2$), and power transmission from the back surface in a sun-oriented attitude to the earth was assumed. The present invention system selected and used a surface most oriented to the earth in the four-surface array antenna. (Each of 1 m$^2$ was selected and used). A power transmission frequency was set to 2.45 GHz. A power receiving site in the vicinity of Tokyo Bay was assumed.

Figure 8:
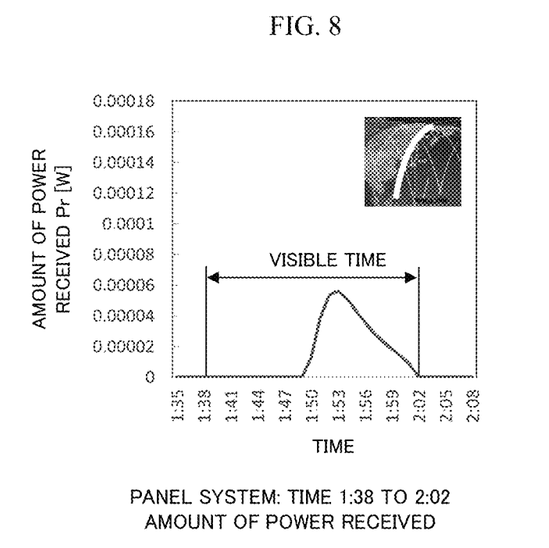
FIG. 8 is a diagram illustrating a result of the simulation of the panel system.

FIG. 8 illustrates a result of the simulation of the panel system. An axis of abscissas indicates time, and an axis of ordinates indicates an amount of power received. In this case, a time during which power reception is possible (1:50 to 2:02) is short with respect to a visible time (1:38 to 2:02) because there is a time during which power transmission is not possible due to the angle of the power transmitting antenna installation surface 6 with respect to a power receiving site on earth.

Figure 9:
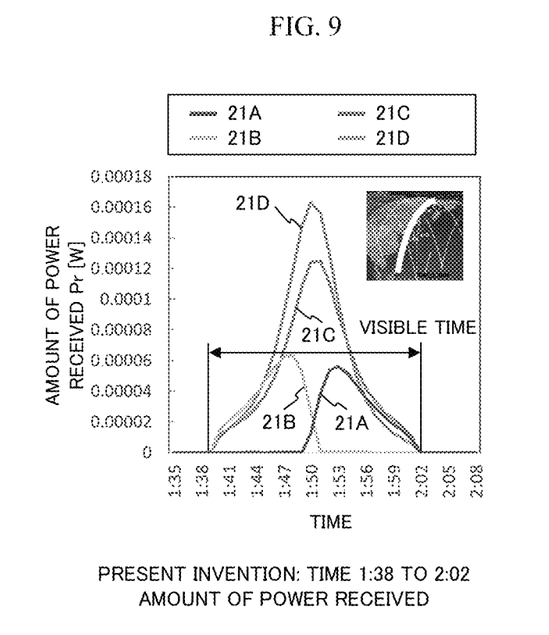
FIG. 9 is a diagram illustrating a result of the simulation of the present invention.

FIG. 9 illustrates a result of the simulation of the present invention. As in FIG. 8, an axis of abscissas indicates time, and an axis of ordinates indicates an amount of power received. In the present invention, light reception on four surfaces (21A to 21D) is possible, and amounts of power received on the four surfaces 21A to 21D are illustrated in FIG. 9. In the present example, power reception on the light receiving surfaces 21C and 21D is possible in substantially the whole period of the visible time (1:38 to 2:02) that is the same as that in FIG. 8, and amounts of power received thereon are also large as compared with FIG. 8. Power reception on the light receiving surface 21A is the same as in FIG. 8. Power reception on the light receiving surface 21B is similar to that of 21A in a first half period of the visible time. Times during which power reception by 21A and 21B is possible (1:38 to 1:50 and 1:50 to 2:02, respectively) are short because there are times during which power transmission is not possible due to the angles of the power transmitting antenna installation surfaces 6 with respect to the power receiving site on earth. The visible time here may be defined as a time period during which an elevation angle looking up at the artificial satellite 10 from a ground station or the power receiving site on earth is equal to or more than a predetermined angle, or may be defined as a time period during which communication is possible.

FIG. 10 is a diagram illustrating a result of comparison between the panel system and the present invention. FIG. 10 illustrates a ratio in a case where an amount of power received in one day in the panel system is set to 1, the ratio of a power reception time with respect to the visible time (pass time), and a ratio in a case where a total power reception time in the panel system is set to 1, the ratios being obtained by the simulation.

According to this comparison, the present invention, which can select and use various surfaces, provided 1.1 times the amount of power received even on a daily average per surface (under the same area condition). That is, in the simulation, the power transmitting antennas 5 on the four surfaces were used, and 4.4 times the amount of power received was obtained, which indicated an increase in the amount of power received per unit area of the power transmitting antennas 5. In addition, the power reception time was also increased 3.13 times, which is considered to be a contributing factor in increasing the amount of power received.

Next, consideration will be given to rotational symmetry axes 13 with respect to a cube assumed as the shape of the casing 7. The rotational symmetry axes 13 pass through the center of the cube. As kinds of rotational symmetry axes that can be taken, there are C2 rotational axes (13C2), C3 rotational axes (13C3), and C4 rotational axes (13C4).

As illustrated in FIG. 11C, the C2 rotational axes are rotational symmetry axes such that the cube has the same shape after a rotation of 360 degrees/2=180 degrees, and are rotational symmetry axes passing through middle points of edges facing each other. Six kinds of C2 rotational axes can be taken.

As illustrated in FIG. 11A, the C3 rotational axes are rotational symmetry axes such that the cube has the same shape after a rotation of 360 degrees/3=120 degrees, and are rotational symmetry axes passing through vertexes facing each other. Four kinds of C3 rotational axes can be taken.

As illustrated in FIG. 11B, the C4 rotational axes are rotational symmetry axes such that the cube has the same shape after a rotation of 360 degrees/4=90 degrees, and are rotational symmetry axes passing through the centers of surfaces facing each other. Three kinds of C4 rotational axes can be taken.

In the first embodiment described above, description has been made of the application of a three-dimensional structure such as a tensegrity structure to space solar power generation. In the first embodiment, a three-dimensional structure such as a tensegrity structure is applied as a power receiving/power transmitting satellite in space in space solar power generation, has one or more solar panels and one or more power transmitting antenna surfaces, and transmits power to a power receiving facility on earth. In a case of a tensegrity structure having eight surfaces, for example, the tensegrity structure can be implemented by a combination of one solar panel surface and seven power transmitting antenna surfaces or a combination of four solar panel surfaces and four power transmitting antenna surfaces. It is to be noted that a method of arrangement of the solar panel 3 and the power transmitting antennas 5 as described in the first embodiment is not limited to the tensegrity structure, and may be implemented by an expandable truss structure or the like.

In the first embodiment described above, each member adopts a symmetric structure and is easy to expand in space, and the power transmitting antennas are oriented in different directions. It is therefore possible to improve the efficiency of power transmission and reception.

Second Embodiment

In the second embodiment, with reference to FIGS. 12 and 13, description will be made of achieving an increase in the capacity of space solar power generation by a plurality of artificial satellites.

Here, an artificial satellite system is configured by flying the artificial satellite in plural number, and the capacity of space solar power generation is increased. The capacity of a space solar power generation satellite system is increased by enlarging the areas of the solar panels 3 and the power transmitting antennas 5.

Figure 12:
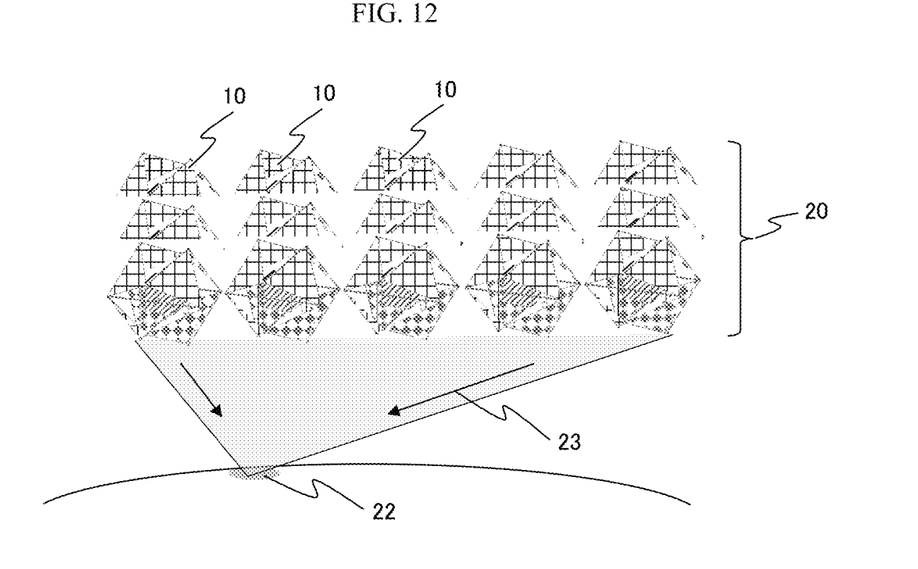
FIG. 12 is a diagram illustrating an example of a configuration of an artificial satellite system 20 in which the artificial satellite 10 is flown in plural number.

FIG. 12 illustrates an example of a configuration of an artificial satellite system 20 in which the artificial satellite 10 is flown in plural number. A total area of the solar panels 3 can be increased by setting the artificial satellites 10 in formation, and each of the artificial satellites 10 can perform power transmission of a microwave 23 to a power receiving facility 22 on earth. It is thereby possible to increase the capacity of the space solar power generation satellites.

Figure 13:
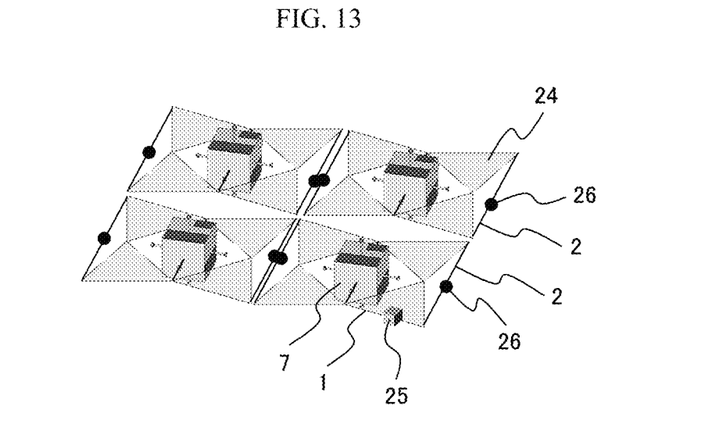
FIG. 13 is a diagram illustrating an example in which thin film parts are modified in addition to formation setting.

FIG. 13 illustrates an example in which thin film parts are modified in addition to the formation setting. A tension controller 25 for a tension member 1 is provided to control the tension of the tension member 1. In addition, a structure controller 26 for a beam member 2 is provided to control the contraction of the beam member 2. FIG. 13 illustrates only some of tension controllers 25 for the tension members 1 and structure controllers 26 for the beam members 2. The posture of each of the thin films 8 with respect to the casing 7 can be changed by lengthening the length of some of the beam members 2, and shortening the length of some of the beam members 2. The thin films 8 can thus be used as posture-changeable thin films 24. When the solar panels 3 and the power transmitting antennas 5 are installed on the posture-changeable thin films 24, orientation angles thereof can be changed.

For example, the postures of the thin films of the artificial satellite 10 are changed by controlling the expansion or contraction and deformation of the beam members 2 and the tension of the tension members 1. It is thereby possible also to, for example, arrange all of the thin films 8 in substantially the same plane and temporally change the postures of the thin films of each of the artificial satellites 10. It is consequently possible to increase power generation efficiency temporarily or increase power transmission efficiency temporarily. An overall power transmission efficiency can hence be expected to be enhanced. In addition, the changing of the postures of the thin films as illustrated in FIG. 13 can be performed in each of the artificial satellites 10 even when the formation setting is not performed.

The second embodiment thus achieves an increase in the capacity of space solar power generation by a plurality of satellites. The capacity of space solar power generation can be increased by flying the plurality of satellites.

Third Embodiment

In the third embodiment, power transmission to a plurality of receiving locations and operation therefor will be described with reference to FIG. 14.

Figure 14:
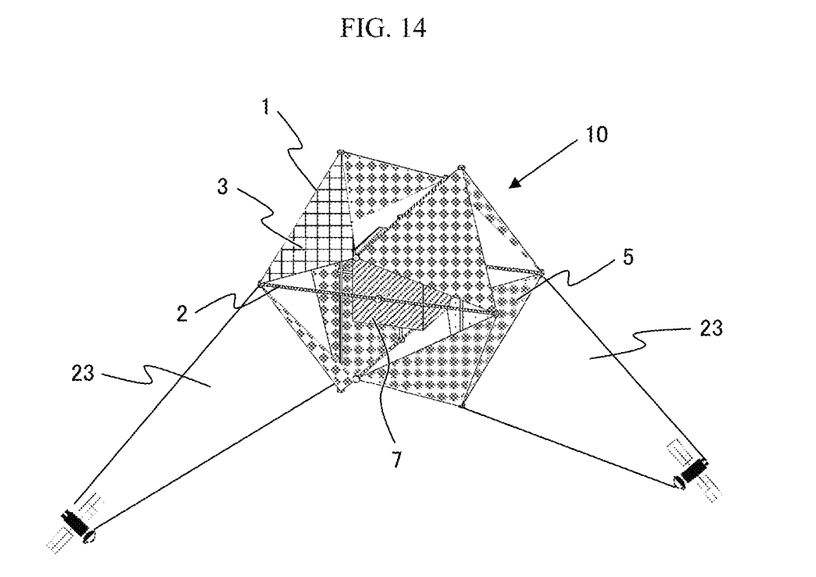
FIG. 14 is a diagram illustrating operation for a plurality of receiving locations on earth.

In FIG. 14, the artificial satellite 10 is rotated about the center of the solar panel 3. Thus, selectivity for receiving points is increased, and power transmission is performed accurately. In addition, a plurality of power transmitting antennas 5 perform power transmission of microwaves 23 to respective different power receiving facilities. It is thereby possible to transmit power to the power receiving facilities scattered over a wide area. The power receiving facilities can include not only facilities installed on earth but also moving bodies such as artificial satellites and aircraft and the like.

Fourth Embodiment

In a fourth embodiment, a thin film on which a solar panel and a power transmitting antenna are installed on the same surface will be described with reference to FIGS. 15 to 17.

Figure 15:
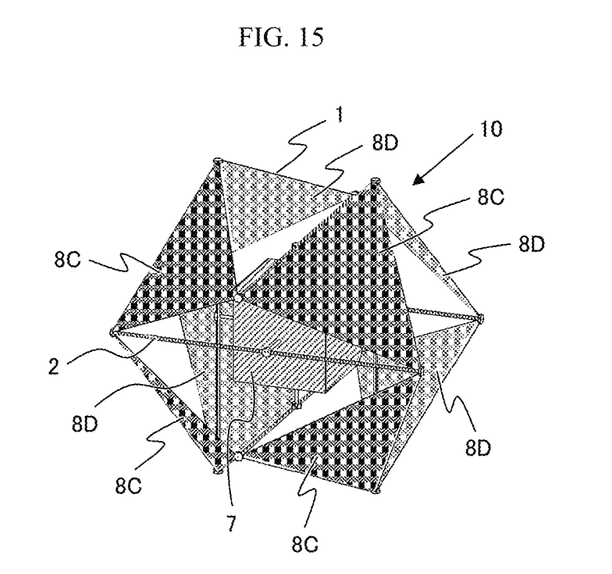
FIG. 15 is a diagram illustrating an example in which some of thin films 8 are thin films 8C each having a solar panel and a power transmitting antenna installed on the same surface thereof and others of the thin films 8 are thin films 8D each having a solar panel installed on one surface thereof and having a power transmitting antenna installed on an opposite surface thereof.

FIG. 15 illustrates an example in which, of the thin films 8 installed in the artificial satellite 10, some of the thin films 8 are thin films 8C each having a solar panel and a power transmitting antenna installed on the same surface thereof and others of the thin films 8 are thin films 8D each having a solar panel installed on one surface thereof and having a power transmitting antenna installed on an opposite surface thereof.

Figure 16:
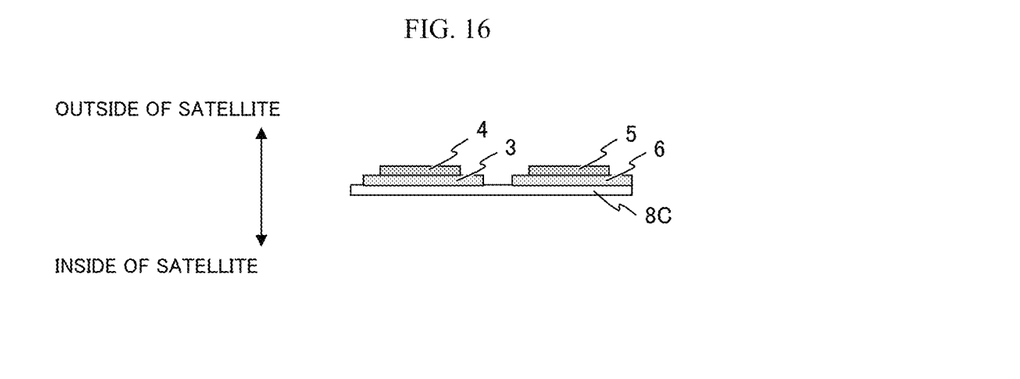
FIG. 16 is a diagram illustrating an example of a configuration of a thin film 8C having a solar panel 3 and a power transmitting antenna 5 installed on the same surface thereof.
Figure 17:
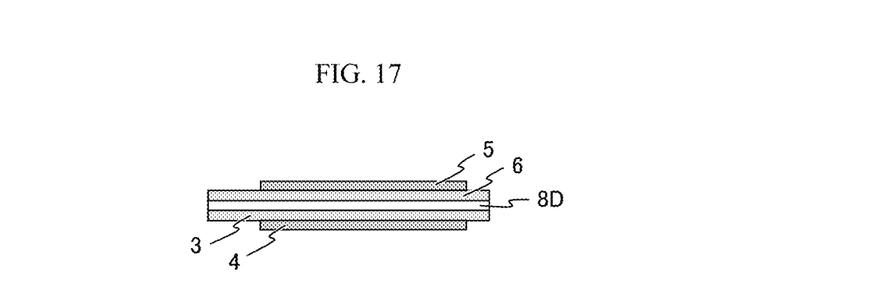
FIG. 17 is a diagram illustrating an example of a configuration of a thin film 8D having a solar panel 3 installed on one surface thereof and having a power transmitting antenna 5 installed on an opposite surface thereof.

FIG. 16 illustrates an example of a configuration of a thin film 8C having a solar panel 3 and a power transmitting antenna 5 installed on the same surface thereof. FIG. 17 illustrates an example of a configuration of a thin film 8D having a solar panel 3 installed on one surface thereof and having a power transmitting antenna 5 installed on an opposite surface thereof.

The present configuration can increase power generation directions and power transmission directions. In addition, the present configuration can increase a power generation time and a power transmission time even in a low orbit. The configuration of FIG. 16 and FIG. 17 may be adopted in a case where a power transmitting antenna 5 is additionally provided to a flat surface originally intended mainly for the installation of a solar panel 3, or the configuration may be adopted in a case where a solar panel 3 is additionally provided to a flat surface originally intended mainly for the installation of a power transmitting antenna 5. The configuration can hence be implemented irrespective of an area ratio between the power transmitting antenna 5 and the solar panel 3.

Fifth Embodiment

In a fifth embodiment, with reference to FIG. 18, description will be made of mounting a solar panel and a power transmitting antenna on the same thin film surface and performing omnidirectional wireless power transmission. The above configuration makes it possible to perform omnidirectional wireless power transmission, and perform power generation and power transmission at all times even in a low orbit.

Figure 18:
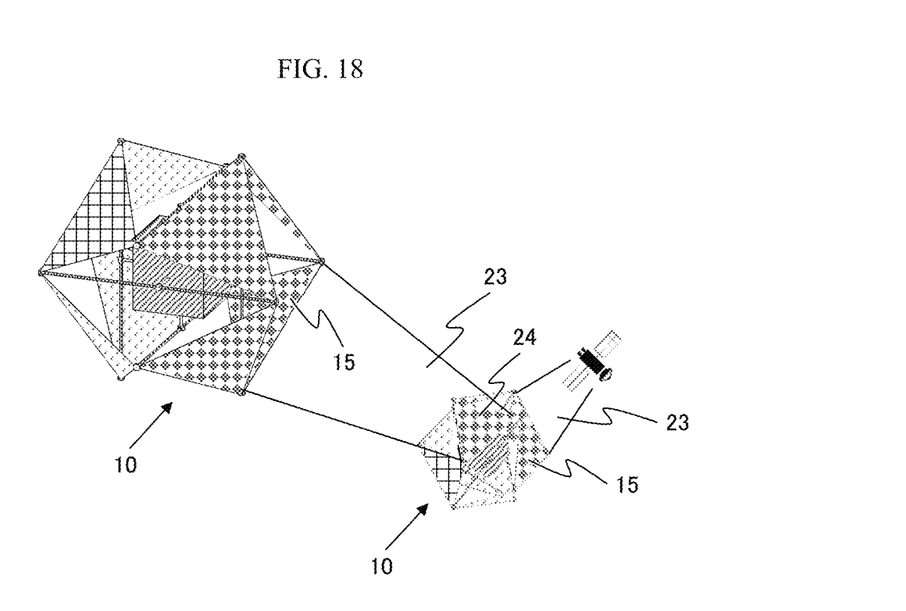
FIG. 18 is a diagram illustrating an example of a configuration in which a solar panel and a power transmitting antenna are mounted on the same thin film surface and omnidirectional wireless power transmission is performed.

FIG. 18 illustrates a configuration further including a rectenna 24 as a power converting device in an artificial satellite 10. The rectenna is an abbreviation of rectifying antenna. The rectenna is an antenna and a circuit that rectify and convert power of a microwave 23 into a direct current. By further including the rectenna 24, the artificial satellite 10 can receive power transmitted by another artificial satellite 10. The artificial satellites 10 can thus transmit and receive power to and from each other while flying in formation. Further, even in a case where the artificial satellite 10 is not irradiated with solar light and thus cannot generate power by the solar panel 3, the artificial satellite 10 can be supplied with power from the other artificial satellite 10.

In a sixth embodiment, power transmission and reception between artificial satellites is made possible by mounting power transmitting antennas 5 and rectennas 24, and a power transmission array patch antenna on one or more surfaces and a rectenna array on one or more surfaces are installed in an artificial satellite 10.

Because power transmission and reception is possible, power can be supplied to another artificial satellite 10 not irradiated with solar light via the artificial satellite 10.

What is claimed is:

1. An artificial satellite for use in space solar power generation and transmission, comprising:
   an expandable solar panel configured to receive solar light and generate power;
   a plurality of expandable power transmitting antennas configured to transmit power generated by the expandable solar panel to a power receiving facility; and
   a plurality of expandable beam members configured to connect the expandable solar panel and the plurality of expandable power transmitting antennas to each other,
   the plurality of expandable beam members being expanded from a state of being provided in the artificial satellite, and on a plurality of rotational symmetry axes of an imaginary polyhedron formed with substantially a center of the artificial satellite as an origin, the plurality of expandable beam members being arranged at substantially equal distances in directions of the rotational symmetry axes,
   at least one light receiving surface of the expandable solar panel and at least one of installation surfaces of the plurality of expandable power transmitting antennas when expanded from the artificial satellite being substantially perpendicular to a solar panel rotational symmetry axis as a rotational symmetry axis passing through substantially a center of the expandable solar panel, and being arranged on opposite sides of a plane passing through substantially the center of the artificial satellite, and
   the installation surfaces of the plurality of expandable power transmitting antennas facing in respective different directions when expanded from the artificial satellite.

2. The artificial satellite according to claim 1, further comprising:
   a rotation control unit configured to control rotation of the artificial satellite,
   wherein the artificial satellite transmits power to the power receiving facility while rotating.

3. An artificial satellite system configured by flying the artificial satellite according to claim 1 in plural number, the plurality of artificial satellites being configured to transmit power to a same power receiving facility.

4. The artificial satellite according to claim 1, wherein power is selectively transmitted to a predetermined power receiving facility from among a predetermined plurality of power receiving facilities by rotating the artificial satellite about the center of the solar panel.

5. The artificial satellite according to claim 1, wherein the plurality of expandable power transmitting antennas respectively transmit power to a plurality of respective power receiving facilities installed in respective different directions.

6. The artificial satellite according to claim 1, wherein one or more of the power transmitting antennas are disposed on a same installation surface as the expandable solar panel of the artificial satellite.

7. The artificial satellite according to claim 1, wherein the solar panel is disposed on a same installation surface as the expandable power transmitting antennas of the artificial satellite.

8. The artificial satellite according to claim 1, further comprising:
   a power converting device.

9. The artificial satellite according to claim 1, further comprising:
   a tension controller for a tension member; and
   a structure controller for a beam member,
   wherein postures of the solar panel and the power transmitting antennas are changed.

\* \* \* \* \*